Oct. 1, 1957 — C. J. SEILER — 2,808,350
METHOD OF IMPREGNATING FIBROUS WEBS WITH A NOVOLAC RESIN
Filed June 19, 1953

INVENTOR.
CHARLES J. SEILER
BY
ATTORNEY

United States Patent Office 2,808,350
Patented Oct. 1, 1957

2,808,350

METHOD OF IMPREGNATING FIBROUS WEBS WITH A NOVOLAC RESIN

Charles J. Seiler, Florham Park, N. J., assignor to Union Carbide Corporation, a corporation of New York Application June 19, 1953, Serial No. 362,965

9 Claims. (Cl. 117—161)

This invention relates to improvements in impregnating fibrous materials with a heat-hardenable binder and the forming of laminate structures from such impregnated fibrous material by subjecting it to heat and pressure. More particularly the invention is concerned with the impregnation of fibrous material in separate impregnating cycles by a novolac type condensation product of a phenol and an aldehyde or ketone, in one stage and by a methylene group engendering agent reactive with the novolac condensate to form a thermoset binder.

Heretofore fibrous materials have been impregnated with volatile organic solvent solutions of heat-hardenable phenol-aldehyde or phenol-ketone condensates. Such solutions were employed since they were low enough in viscosity to adequately impregnate the fibrous materials. The condensates on a volatile free basis are ordinarily too viscous or even of a solid nature at room temperature to readily penetrate and impregnate fibrous materials. In the use of solvent solutions, it is necessary to remove the solvent from the impregnated material before it can be satisfactorily laminated as otherwise blisters or explosions of the laminate may result. The solvent removal step is inherently hazardous due to the explosive hazard always present with volatile solvents such as alcohol, benzene, ketones and the like. Moreover the solvent vapors unless recovered by suitable apparatus constituted an economic loss.

A further disadvantage attendant in the use of solvent impregnating processes, is that a moderate degree of heat is necessary to remove the solvent rapidly enough for practical manufacture. Such heating tends to partially cure the phenolic impregnant to a condition of decreased plasticity and thus inadequate bonding of individual fibrous sheets to each other is likely to happen during the laminating operations. Furthermore it is exceedingly difficult in practical laminate manufacture to secure a consistent degree of partial cure of the resin, in that the drying operation must be carried to completion even though the resin may be unduly precured in so doing. The situation is further complicated by the fact that the properties of these heat-hardenable phenolic resins as made in batch to batch manufacture do vary despite efforts to reduce the variation to a minimum, and furthermore the phenolic resins slowly react at room temperature to higher molecular weight products as evidenced by the increasing viscosities of their solutions on storage, some solutions even forming a gelled mass within a day's time of their preparation.

Accordingly, one of the objects of my invention is to avoid the use of volatile organic solvents in impregnating fibrous sheet matter intended for laminate constructions.

Another object of my invention is the preparation of impregnated fibrous sheet material having as the impregnant one exhibiting not only a high degree of flow at mold pressing temperatures permitting rapid closing of the press, but which is also characterized by rapidly heat-hardening to an infusible condition preventing any substantial loss of impregnant by the squeeze-out pressure of the press.

A further object of my invention is the preparation of laminates having improved properties including better dimensional stability, hardness both at room and elevated temperatures, higher compressive strength and modulus of elasticity than laminates made from conventional phenol resins. The accomplishment of the above objects and others hereinafter described, will be evident as the description proceeds.

According to my invention a thermosetting binder is incorporated in fibrous material suitable for laminate manufacture without resorting to the use of highly volatile organic solvents such as alcohol, benzene and the like, by a process involving two separate stages of impregnation, the first stage comprising impregnating the fibrous material with an impregnant which deposits itself on the fibrous material in the form of fine crystals whereby the fibrous material retains sufficient porosity to be readily penetrated by the impregnant of the second stage, and the second stage comprising impregnating the fibrous material with an impregnant capable of reacting upon heating with the impregnant of the first stage to form a thermoset resinous binder. More particularly the two impregnants capable of reacting together to form a thermoset resinous binder are (1) a novolac type condensation product of a phenol and an aliphatic aldehyde or ketone, said novolac being reactive with methylene group engendering agents to form a thermoset binder and (2) a water-soluble methylene group engendering agent such as hexamethylenetetramine which is solid at room temperature and which crystallizes from aqueous solutions.

Figure 1:
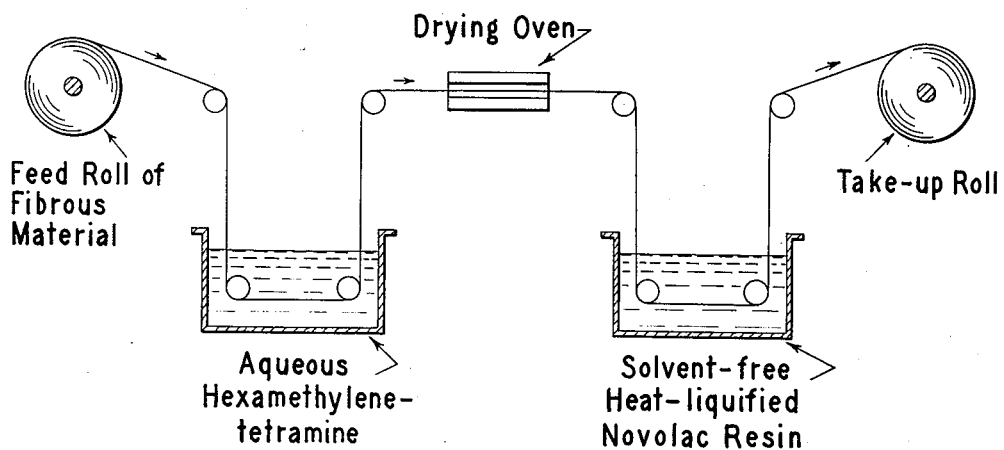
Figure 1 illustrates the mode of operation wherein the fibrous material is initially impregnated with an aqueous solution of hexamethylenetetramine, dried and then impregnated with a heat-liquefied novolac resin and then cooled.
Figure 2:
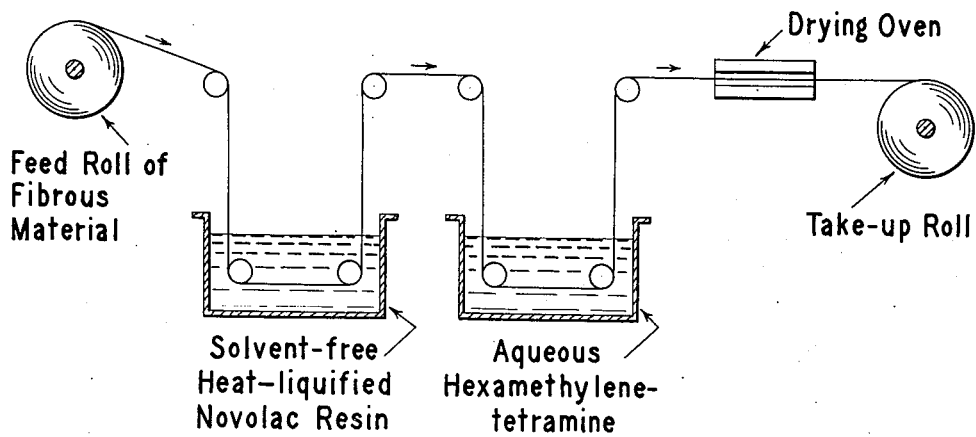
Figure 2 illustrates impregnation of fibrous webs first with a solvent-free, heat-liquefied crystallizable novolac resin, and then after cooling with an aqueous solution of hexamethylenetetramine followed by a drying step to remove moisture.

The novolac condensation products having utility as fibrous impregnants are normally resinous or crystalline solids at room temperature. Instead of as heretofore, dissolving them in a volatile organic solvent such as alcohol, benzene and the like to render them fluid enough to function as an impregnant, I heat them to a liquefying temperature in the absence of such volatile solvents, in order to impregnate the fibrous matter.

Hexamethylenetetramine is also a solid at room temperature, and to use it as an impregnant, I dissolve it in water. Fibrous matter impregnated with an aqueous solution of hexamethylenetetramine must be dried before it can be processed further, however, water as a solvent eliminates costly organic solvents as well as their fire hazards.

As noted above, a critical feature of my invention is that the first impregnation step must leave the fibrous matter in a porous condition whereby the second impregnant can readily permeate the fibrous material. I have found that this result can be had either by first impregnating the fibrous material with an aqueous solution of a suitable methylene group engendering agent, particularly hexamethylenetetramine, which upon drying deposits fine crystals of hexamethylenetetramine throughout fibrous material including such relatively dense fibrous material as cellulosic paper, or by first impregnating with certain molten novolac condensation products which upon being rapidly cooled crystallize in finely divided form.

In the instance of water-sensitive fibrous material such as cellulosic paper which may be temporarily weakened when treated with an aqueous solution of hexamethylenetetramine, I prefer to first impregnate such types of fibrous matter with the crystalline types of novolacs, which because of their water-insolubility impart considerable wet strength to the fibrous matter, whereby when it is subsequently treated with the aqueous solution of hexamethylenetetramine it is not readily injured by being subjected to the manipulations necessary to pass it through such solution and the subsequent drying thereof.

The crystallizable novolacs particularly useful as impregnants are the diphenylols and triphenylols represented by the following chemical structure:

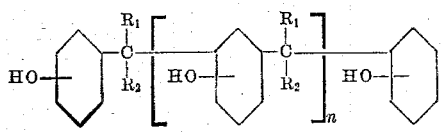

wherein $R_1$ and $R_2$ respectively are either or both hydrogen or an alkyl group; $n$ is zero or one; at least one of the phenolic nuclei has two active nuclear positions for cross-linking with a methylene group engendering agent and the remaining phenolic nuclei each may have one or two active nuclear positions, and substituents if any on any phenolic nucleus being restricted to alkyl or chlorine.

Specific examples of crystallizable novolac type products where $n$ is zero and both phenolic nuclei each have two active positions are the 2,2'-, 2,4'- and the 4,4'-isomers of dihydroxydiphenyl methane, $CH_2(C_6H_4OH)_2$; of dihydroxydiphenyldimethylmethane,

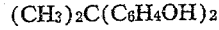

of dihydroxy-diphenylethylmethyl methane, $C_2H_5C(CH_3)(C_6H_4OH)_2$; and of dihydroxy-diphenylmethylmethane $CH_3CH(C_6H_4OH)_2$; and the diphenylols obtained by reacting meta xylenol, meta cresol or meta chlorophenol in large molar excess (5 or more mols) with a mol of formaldehyde or acetone.

Specific examples of crystallizable triphenylol novolacs, where $n$ represents one in the above formula, and all the terminal phenolic nuclei each have two active positions are 2,4-bis(4-hydroxybenzyl) phenol; 2,6-bis-(4-hydroxybenzyl) phenol; and 2,6-bis(2-hydroxybenzyl) phenol whose preparation and properties are described by Bender et al. in Industrial and Engineering Chemistry, vol. 44, page 1619, July 1952.

Specific examples of crystallizable novolac type products in which one phenolic nuclei has two active positions and the remaining phenolic nuclei have only one active position are the unsymmetrical diphenylols such as are obtained by reacting a molar quantity of a methylol substituted phenol such as saligenin with usually five or more mols of a para- or ortho- alkyl or chloro substituted monohydric phenol such as ortho cresol, para tertiary butyl phenol or ortho chlorophenol as is described in the copending application of Bender et al. Serial No. 72,992, now Patent No. 2,744,882. These crystallizable unsymmetrical diphenylols include among others 2,2'-dihydroxy-3' methyldiphenyl methane; 2,2'-dihydroxy-5'-methyl diphenylmethane; 2,2'-dihydroxy-3'6'-dimethyldiphenyl methane and 2,2'-dihydroxy-5'-tertiary butyl diphenyl methane.

The crystalline diphenylols and triphenylols as herein described can be used alone or in admixture, and in pure form or in impure mixtures containing higher molecular weight novolac type condensation products comprising essentially linear condensates of from 4 to more than 20 methylene or alkyl substituted methylene linked phenolic nuclei. These higher molecular weight condensates are normally brittle resins at room temperature but when heated sufficiently, liquefy to more or less fluid masses. For example a typical solid, conventional novolac resin obtained by reacting together a mol of phenol and 0.85 mol formaldehyde in the presence of an acid catalyst has a softening point between 80° and 95° C. by the ball and ring method, but when heated to 140° C. has a viscosity of about 60 poises.

Up to about a 35% by weight content of these higher molecular weight novolac type condensates can be present in admixture with a diphenylol novolac or up to about 30% with a triphenylol novolac to yield impregnating composition characterized by forming a crystalline deposit on fibrous matter when rapidly cooled from a molten state. Since the diphenylols and triphenylols generally distill over at temperatures between 160 and 225° C. at 1 mm. Hg pressure, a novolac condensate mixture which when subjected to distillation under these conditions yields at least about 65% by weight quantity of distillate between 160 and 225° C. in most instances will deposit in crystalline form on fibrous matter.

Novolac mixtures containing less than about 65% by weight content of diphenylols and/or triphenylols can not be satisfactorily used in the initial impregnation of fibrous matter, because these mixtures when applied in the molten state to fibrous matter do not crystallize upon cooling, but instead remain on the fiber surfaces as more or less continuous resinous coatings. These coatings being of a hydrophobic nature prevent adequate impregnation of the fibrous structure when it is subsequently treated with aqueous solutions of hexamethylenetetramine, in that an ineffective amount of hexamethylenetetramine is retained after drying of the fibrous structure to accomplish heat-hardening of the novolac impregnant.

On the other hand, the novolac mixtures containing less than about 65% by weight of diphenylols or triphenylols and even novolacs free of such phenylols are effective as impregnants, providing the fibrous material has been first impregnated with an aqueous solution of hexamethylenetetramine and then dried to form a crystalline deposit of hexamethylenetetramine throughout the fibrous structure. When fibrous matter thus impregnated with hexamethylenetetramine is then treated with either crystalline or resinous novolac products rendered fluid by heating, the liquid novolac not only wets the hexamethylenetetramine but forms a solution therewith.

A major advantage attendant however from the use of crystalline diphenylols or triphenylols as either the first stage or second stage impregnant is that they form liquids of high fluidity at temperatures only a few degrees above their melting point, and thus are highly penetrative into dense fibrous materials such as cellulosic paper. For example the melting point of 2,2'-diphenylol methane (97–99% purity) is 118.5–119.5° C., but at 120° C. it has the very low viscosity of about 30 centipoises. On the other hand, a typical conventional novolac resin having an average chain length of about six to eight phenolic nuclei, begins to soften at about 90° C.; at 140° C. it is a viscous liquid having a viscosity of about 6000 centipoises and even at 160° C. its viscosity is still fairly high being about 500 centipoises. To some extent the fluidity of these conventional novolac resins can be increased by having present therein some unreacted monohydric phenol such as phenol, cresol, para tertiary butyl phenol and the like. Preferably the amounts of unreacted phenol should not exceed about 30 percent by weight of the novolac resin since this unreacted phenol generally reacts with hexamethylenetetramine to form an infusible resin at a slower rate than the novolac resin.

The fluidity of conventional novolac resins can also be improved by mixing them with diphenylols or triphenylols. Exemplary of such results is a novolac composition comprising 39% by weight of isomeric dihydroxy diphenylol methanes and the balance being a phenol-formaldehyde novolac resin having an average chain length of about four to six phenol nuclei. This composition at 90° C. had a viscosity of about 1500 centipoises and at 120° C. a viscosity of about 50 centipoises.

In general while most novolac type condensation products are reasonably stable at elevated temperature, it is not advisable to heat them in impregnating tanks to temperatures above 200° C. as some decomposition to rubbery products may occur, particularly in the presence of trace amounts of metallic or other catalysts.

In the impregnation of fibrous sheeting with the aqueous solution of hexamethylenetetramine, the amount of hexamethylenetetramine deposited in the sheeting is subject to control by solution concentrations, a 20 to 35 percent hexamethylenetetramine solution being preferred, although higher or lower concentrations are also operable. Further control on the amount of hexamethylenetetramine deposited can be had by use of pressure rolls or equivalent means to remove hexamethylenetetramine solution in excess of that desired. Sufficient hexamethylenetetramine must be deposited however, in the fibrous sheeting to insure the heat-conversion of the novolac. For example in the instance of the diphenylols there is required on a molar basis at least one mol of hexamethylenetetramine per 7 mols of diphenol, or expressing it by weight at least 10% of the weight of the diphenylol. With the higher molecular weight triphenylols and resinous novolacs as little as 5% by weight of hexamethylenetetramine may be sufficient as will be understood by those skilled in the art.

Preferably more than such minimum amounts of hexamethylenetetramine are normally used in order to obtain a faster rate of heat-hardening, for example between 15 and 30 parts of hexamethylenetetramine per 100 parts by weight of diphenylol and between 10 and 20 parts per 100 parts of triphenylols or resinous novolacs.

The amount of novolac impregnant required for satisfactory bonding is generally between 25 and 65% of the weight of the final laminate but may be more or less depending on the type of fiber and ultimate strength desired in the laminate.

Fibrous material which can be impregnated and bonded with novolac-hexamethylenetetramine compositions include sheetings made with either mineral or organic fibers, for example asbestos paper, glass fiber fabrics or batting, cellulosic paper, plywood, cotton, linen and other natural fiber fabrics, and fabric or batting of those synthetic fibers such as nylon, glycol-terephthalate linear polyesters, polytetrafluoroethylene and the like which have a melting point higher than the 120 to 200° C. heat-conversion temperature range of the novolac-hexamethylenetetramine composition.

The following examples illustrate several embodiments of the invention, but are not to be construed in limitation thereof other than as set forth in the appended claims.

EXAMPLE I 2,2' dihydroxy diphenyl methane of 97% purity was heated in an impregnating tank to 120° C. at which temperature it had a viscosity of 30 centipoises. A 10 mil alpha cellulose paper having a basic weight of 80 pounds was impregnated by dipping it in the molten 2,2' dihydroxy diphenyl methane and then passed through squeeze rolls, applying sufficient pressure to the paper so that the paper after passing through the rolls contained 45% by weight of the 2,2' dihydroxy diphenyl methane. The paper was then cooled rapidly (within less than 1 minute) to room temperature to cause crystallization of the diphenylol methane within the cellulose fibers. The paper was then passed through a 45% by weight aqueous solution of hexamethylenetetramine, and then between squeeze rolls adjusted to squeeze out enough excess aqueous solution to leave in the paper a 12% by weight quantity of dry hexamethylenetetramine. The treated sheet was then heated for 3½ minutes at 130° C. to remove the water solvent and to effect reaction between the diphenylol methane and the hexamethylenetetramine to form a heat-hardenable fusible resin. A laminated panel was then made by stacking 19 layers of the impregnated sheets and molding the stack at 1200 p. s. i. for 25 minutes at 155° C. temperature.

EXAMPLE II

The same paper as used in Example I was first impregnated with a 40% by weight aqueous solution of hexamethylenetetramine under conditions depositing a 12% by weight content of hexamethylenetetramine. The paper was dried by passing it through a convection oven maintained at 116° C. for a 90 second exposure. The dried paper contained the hexamethylenetetramine uniformly dispersed therein the form of crystals. The paper was then passed through a treating tank containing a molten novolac mixture maintained at a temperature of 105° C., said mixture consisting of 75% by weight of isomeric diphenylol methanes (48%, 2,2'-dihydroxy diphenyl methane; 32.4% 2,4'-dihydroxy diphenyl methane and 19.2% 4,4'-dihydroxy diphenyl methane) and 25% by weight tri- and tetraphenylol methanes, said phenolic mixture having been obtained by reacting 20 mols of phenol with a mol of formaldehyde at 184° C. temperature in the presence of zinc oxide catalyst, said molten mixture having a viscosity of 40 centipoises at 105° C. After passing through the phenolic mixture, the paper was fed through nip rolls and over scraper bars to remove excess novolac, whereby a treated sheet was had containing 43.4% by weight of the novolac. The treated sheet was then heated for three minutes at 142° C. to form a solution of the novolac and the hexamethylenetetramine. Twenty of the so treated sheets were stacked together and the stack then molded in a press at 1200 p. s. i. for 35 minutes at 155° C.

EXAMPLE III

A woven cotton cloth weighing 8 ounces per sq. yd. was impregnated with hexamethylenetetramine by passing the cloth through a 40% aqueous solution of hexamethylenetetramine and then drying the cloth for 2 minutes at 115° C. The cloth was then passed through an impregnating bath held at 100° C. and containing a novolac composition resulting from reacting 10 mols of phenol with a mol of formaldehyde at 161° C., and in the presence of zinc oxide as a catalyst, whereby there was obtained a reaction product consisting of 63% by weight of dihydroxwy diphenylmethanes (of which 78% was 2,2'-dihydroxy diphenylmethane, and 22% was a mixture of 2,4'- and 4,4'-dihydroxy diphenylmethanes) and 37% comprises essentially isomeric tri and tetra hydroxy benzylenes. The reaction product was an amorphous semi-crystalline resin at room temperature, but formed a liquid having a viscosity of 70 centipoises when heated to 100° C. After passing through the bath of the molten novolac composition, the combined weight of the novolac and hexamethylenetetramine in the cloth was 48% by weight of the so treated cloth. The cloth was then heated at 116° C. for 2.1 minutes to partially react together the hexamethylenetetramine and the phenolic mixture. Laminated panels were formed from the treated sheets by stacking them in a laminating press and molding them at pressures between 300 p. s. i. and 1200 p. s. i. at 165° C. temperature for 30 minutes.

EXAMPLE IV

Alpha cellulose paper having a basic weight of 80 pounds was impregnated with a 40% by weight aqueous solution of hexamethylenetetramine and then passed through squeeze rolls applying sufficient pressure to leave a 17.4 percent by weight quantity of hexamethylenetetramine in the paper after being dried at 110° C. temperature. The paper after drying was then passed through a bath held at 100° C. and containing a phenol-formaldehyde novolac reaction product consisting of 39 percent by weight of isomeric dihydroxy diphenyl methanes (of which 86 percent was the 2,2' isomer and 14 percent was a mixture of the 2,4' and 4,4' isomers), 1.9 percent phenol, and 11 percent tri hydroxy benzylenes having the structure:

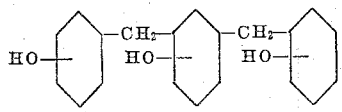

and 48 percent polyhydroxy benzylenes having the structure:

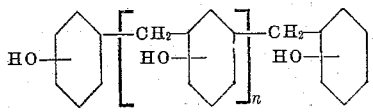

wherein $n$ is an integer more than one. This novolac mixture had a viscosity of 400 centipoises at 100° C. The paper after passing through the molten novolac mixture and then through squeeze rolls contained 40% by weight of the novolac mixture. The paper was then heated at 140° C. for 2 minutes to partially react the hexamethylenetetramine with the phenolic mixture. Laminates were molded from the so-prepared paper by subjecting a stack of the paper to a pressure of 1200 p. s. i. and a temperature of 160° C. for 30 minutes.

EXAMPLE V

Alpha cellulose paper having a basic weight of 80 pounds was impregnated with an aqueous solution of hexamethylenetetramine as described in Example IV whereby the treated paper contained 17.6 percent by weight of dry hexamethylenetetramine. The paper was then passed through a bath held at 100° C. containing a molten novolac mixture of which 60% by weight consisted of isomeric dihydroxy dicresyl methanes and 40% by weight of polyhydroxy methyl benzylenes. This novolac mixture at 100° C. had a viscosity of 100 centipoises and was prepared by condensing 1.4 mols of commercial meta cresol with a mol of formaldehyde in the presence of 0.5% amount of acetic acid catalyst for 240 minutes at a temperature of 100° C. The amount of novolac deposited on the treated paper was 40% by weight. Thereafter the treated paper was heated for 6.7 minutes at 143° C. to form a fusible reaction product of the hexamethylenetetramine and the novolac. Laminates were made from the treated paper by stacking together 18 impregnated sheets and molding the stack for 25 minutes at a temperature of 160° C. and under a pressure of 1200 p. s. i.

EXAMPLE VI

Alpha cellulose paper was impregnated with an aqueous solution of hexamethylenetetramine as described in Example II, whereby the paper after drying contained 12% by weight of hexamethylenetetramine. The so treated paper was then impregnated with a novolac mixture by passing it through a bath held at 140° C. and containing a mixture of diphenylols of which 80% was 4,4' dihydroxy diphenyl dimethyl methane (prepared from acetone and phenol) and 20% was a mixture of equal parts of 2,2' and 2,4'-dihydroxy diphenyl methanes. The paper after passing through the diphenylol bath and then through squeeze rolls contained 40% by weight of diphenylols. Laminates were made from the treated paper by stacking 19 of the impregnated sheets together and molding the stack for 40 minutes at a temperature of 150° C. and under a pressure of 1200 p. s. i.

EXAMPLE VII

A novolac composition containing approximately 40% isomeric dihydroxy diphenyl methanes, 18% triphenylols, 40% polyhydroxy benzylenes, and 2% phenol was prepared by heating 950 grams (10+ moles) phenol with 130 grams (1.6 moles) formalin (37.5% formaldehyde) and 3.2 grams zinc oxide under reflux at 113–115° C. for 2.5 hours and then at 160° C. allowing water to distill off for thirty minutes, then vacuum was applied and the mass steam distilled. In the distillation about 70% of the phenol was recovered. The composition which had a viscosity of approximately 400 cps. at 100° C., was used to impregnate a paper which had been previously impregnated with hexamethylenetetramine using the procedure described in Example II. The total amount of hexamethylenetetramine and novolac composition deposited was 50% by weight of the treated paper. Laminates were made from the treated paper by stacking together 19 of the so impregnated sheets and molding the stack for 35 minutes at a temperature of 150° C. and under a pressure of 1200 p. s. i.

EXAMPLE VIII

A novolac composition containing approximately 60% isomeric dihydroxy dicresyl methanes, 38% polyhydroxy methyl benzylenes and 2% cresol was prepared by heating 130 grams cresol (1.2 moles) with 70 grams (.87 mole) formalin, 37.5% formaldehyde and 1 gram oxalic acid under reflux for four hours at 100° C. The mass was dehydrated by heating to 140° C. This composition which had a viscosity of approximately 100 centipoises at 100° C. was used to impregnate a hexamethylenetetramine impregnated paper as described in Example V. The total amount of hexamethylenetetramine and novolac composition deposited was 50% by weight of the treated paper. Laminates were made from the treated paper by stacking together 19 of the so impregnated sheets and molding the stack for 25 minutes at a temperature of 150° C. and under a pressure of 1200 p. s. i.

EXAMPLE IX

A conventional novolac resin was prepared by reacting together all parts being weight, 100 parts phenol (1.06 mol), 69 parts formalin (0.824 mol) and 4 parts oxalic acid for 5 hours at 100° C. under atmospheric reflux conditions. The acid catalyst was then neutralized with lime and the neutralized reaction product dehydrated by heating to about 120° C. under sub-atmospheric pressure. The resultant dehydrated product was a brittle resin having a softening point by the ball and ring method between 80° and 90° C., and when heated to 140° had a viscosity of about 6000 centipoises, and at 160° C. about 550 centipoises. This novolac resin is typical of the conventional brittle novolacs customarily employed in the preparation of thermosetting molding compositions in that it contained less than 10% by weight of diphenylols in admixture with numerous longer chain polyphenylol methanes having 3 and more phenolic nuclei in their chains. Paper impregnated with hexamethylenetetramine as described in Example 2 was then impregnated with a 45% by weight content of the above described novolac resin by heating the novolac resin in an impregnating tank to 160° C. and then passing the hexamethylenetetramine impregnated paper through squeeze rolls to remove excess novolac resin. The novolac-hexamethylenetetramine treated paper was then heated for 2 minutes at 140° C. to partially react together the resin and hexamethylenetetramine. A laminate was then made by stacking 18 of the so treated paper sheets in a press and subjecting the stack to a pressure at 165° C. of 1200 p. s. i. for 35 minutes to heat-convert the resinous impregnant.

The physical and electrical properties of the laminates prepared in the several examples are summarized in the following table.

Table I

| | Ex. I | Ex. II | Ex. III | Ex. IV | Ex. V | Ex. VI | Ex. VII | Ex. VIII | Ex. IX |
|---|---|---|---|---|---|---|---|---|---|
| Water absorption 24 hours at 25° C. by weight | 1.31 | 0.49 | 2.40 | 1.53 | 0.63 | 0.57 | 1.53 | 1.43 | 1.95 |
| Dielectric strength (perpendicular to Laminate) volts per mil thickness | 500 | 640 | | | | | | | 400 |
| Flexural strength, p. s. i. | 30,000 | 29,000 | 25,000 | 26,000 | 21,000 | 26,000 | 23,000 | 23,000 | 25,000 |
| Flexural modulus, p. s. i. ($\times 10^7$) | 1.7 | 2.0 | 1.2 | 2.0 | 1.8 | 1.9 | 2.0 | 1.8 | 1.8 |
| Compressive strength, p. s. i. | 56,000 | 58,000 | 52,000 | 58,000 | 49,000 | 51,000 | 58,000 | 51,000 | 58,000 |
| Flat edge | 37,000 | 41,000 | 32,000 | 36,000 | 33,000 | 35,000 | 36,000 | 33,000 | 37,000 |
| Heat Distortion, ASTM-D-648, °C. | | 180 | | | | 155 | | 150 | |
| Rockwell Hardness | M-107 | M-121 | M-112 | M-120 | M-117 | M-119 | M-120 | M-118 | M-120 |

The step described in the several examples of partially reacting together the hexamethylenetetramine and novolac components in the impregnated fibrous material is readily controlled by selection of temperatures and duration of exposure to such temperature to obtain most any specific degree plasticity required to conform to particular laminating conditions. For example, use of high laminating pressure, e. g., 1000 p. s. i. and higher requires an impregnant of relatively low plasticity to avoid excessive squeeze-out of the impregnant during the laminating operation. On the other hand, low pressure or contact pressure laminating operations, for example 50 to 100 p. s. i. requires an impregnant of high plasticity and hence, either none or only a slight preliminary reaction between the novolac and hexamethylenetetramine before it is subjected to laminating heat and pressure would be preferred in such instances to obtain maximum plasticity.

In comparison with fibrous materials impregnated with volatile organic solvent solutions of heat-hardenable phenolic resins, such as the resoles, or novolacs in solvent solution with a methylene group engendering agent such as paraform or hexamethylenetetramine, the fibrous material impregnated with novolac condensates and hexamethylenetetramine in separate stages as herein described can be consistently made to have a lower content of volatile matter than the solvent type impregnated fibrous matter.

A standard test for determining the volatile content of solvent-resin type of impregnated fibrous matter is to heat a sample for 10 minutes at 150° C. in a circulating air oven and under such conditions a volatile content of at least 3% and usually about 5 percent by weight is ordinarily expected. While a lower volatile content is desirable to help avoid blister formation in laminate production, the phenolic resins inherently do not readily release the last vestiges of organic solvent, and drastic heating of the solvent type impregnated fibrous material to release all the volatile solvent matter is not feasible due to the fact that the resinous binder will heat-convert to a non-plastic condition.

Fibrous matter separately impregnated with a novolac condensate and hexamethylenetetramine and exposed to the necessary heating conditions for their application as herein described, including all the examples, normally has a volatile content of two percent by weight or less as determined by the above described test procedure and thus is less likely to form blisters or delaminations by release of volatiles during the laminating operation.

What is claimed is:

1. Method of uniformly impregnating fibrous webs with a heat-hardenable binder, the impregnated material being adapted for the production of laminated articles, which comprises the separate steps of impregnating porous fibrous material with an aqueous solution of hexamethylenetetramine and with a solvent-free, heat-liquefied novolac resin reactive with the hexamethylenetetramine to form a heat-hardenable binder, said resin being liquefiable at a temperature below the curing temperature thereof to a degree sufficient to permit uniform impregnation of said web and being one which on cooling forms a crystalline deposit in the web, the impregnant first applied to the fibrous material being one which deposits itself on the fibrous material in such manner that sufficient porosity is retained by the fibrous material for impregnation by the second impregnant.

2. Method of uniformly impregnating fibrous webs with a heat-hardenable binder for the production of laminated articles therefrom, which comprises initially impregnating the fibrous material with an aqueous solution of hexamethylenetetramine, drying the impregnated material to deposit the hexamethylenetetramine on the fibrous material in crystalline form, and then impregnating the fibrous material with a solvent-free, heat-liquefied novolac resin reactive with the hexamethylenetetramine to form a heat-hardenable binder, said resin being liquefiable at a temperature below the curing temperature thereof to a degree sufficient to permit uniform impregnation of said web and being one which on cooling forms a crystalline deposit in the web.

3. Method of uniformly impregnating fibrous webs with a heat-hardenable binder for the production of laminated articles, which comprises initially impregnating the fibrous material with a heat-liquefied, solvent-free crystallizable novolac reactive with hexamethylenetetramine to form a heat-hardenable binder and selected from the group consisting of diphenylols and triphenylols and mixtures thereof, said novolac resin being a crystallizable novolac resin containing a major amount of polyphenylols having the structure:

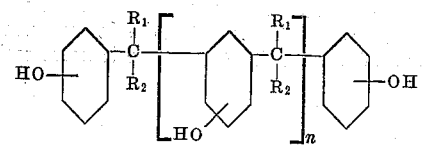

wherein $R_1$ and $R_2$ are selected from the group consisting of hydrogen and alkyl radicals and $n$ has a value between zero and one, cooling the impregnated material to crystallize the novolac on the fibrous material, then impregnating the fibrous material with an aqueous solution of hexamethylenetetramine and then drying the fibrous material.

4. Method of uniformly impregnating fibrous webs with a heat-hardenable binder, the impregnated material being adapted for the production of laminated articles, which comprises the separate steps of impregnating porous fibrous material with an aqueous solution of hexamethylenetetramine and with a solvent-free, heat-liquefied novolac resin reactive with the hexamethylenetetramine to form a heat-hardenable binder, said resin being liquefiable at a temperature below the curing temperature thereof to a degree sufficient to permit uniform impregnation of said web and being one which on cooling forms a crystalline deposit in the web, the impregnant first applied to the fibrous material being one which deposits itself on the fibrous material in such manner that sufficient porosity is retained by the fibrous material for impregnation by the second impregnant and then heating the twice impregnated fibrous material to form a solution of the methylene group engendering agent and the novolac.

5. Method of uniformly impregnating fibrous webs with a heat-hardenable binder for the producing of laminated articles therefrom, which comprises initially impregnating the fibrous material with an aqueous solution of hexamethylenetetramine, drying the impregnated material to deposit the hexamethylenetetramine on the fibrous material in crystalline form, and then impregnating the fibrous material with a heat-liquefied solvent-free novolac reactive with the hexamethylenetetramine to form a heat-hardenable binder said resin being liquefiable at a temperature below the curing temperature thereof to a degree sufficient to permit uniform impregnation of said web and being one which on cooling forms a crystalline deposit in the web, and then heating the twice impregnated material to form a solution of the hexamethylenetetramine and the novolac.

6. Method of uniformly impregnating fibrous webs with a heat-hardenable binder, the impregnated material being adapted for the production of laminated articles, which comprises first impregnating the fibrous material with a heat-liquefied solvent-free novolac condensate of a monohydric phenol and an aliphatic aldehyde, said condensate containing a sufficient amount of phenol derivatives selected from the group consisting of diphenylol and triphenylol condensates to impart crystallizable properties to the novolac, said novolac resin being a crystallizable novolac resin containing a major amount of polyphenylols having the structure:

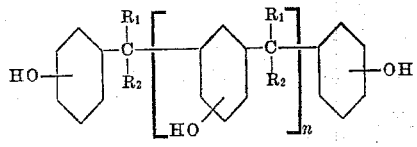

wherein $R_1$ and $R_2$ are selected from the group consisting of hydrogen and alkyl radicals and $n$ has a value between zero and one, then impregnating the fibrous material with a sufficient amount of an aqueous solution of hexamethylenetetramine to render the novolac condensate heat-hardenable.

7. Impregnated fibrous material adapted for the manufacture of laminated articles, comprising a fibrous sheet material containing as a heat-hardenable impregnant a solvent-free novolac resin reactive with hexamethylenetetramine and hexamethylenetetramine in amount to form with the novolac resin on heating a thermoset resin, said novolac resin being a crystallizable novolac resin containing a major amount of polyphenylols having the structure:

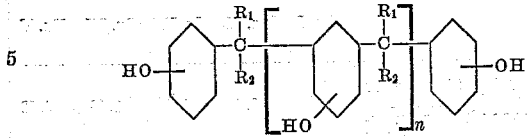

wherein $R_1$ and $R_2$ are selected from the group consisting of hydrogen and alkyl, $n$ is zero or one, said impregnated material having a volatile content not in excess of two percent by weight as determined by heating a sample for 10 minutes at 150° C. in a circulating air oven.

8. Impregnated fibrous material adapted for the manufacture of laminated articles, comprising a fibrous sheet material containing as a heat-hardenable impregnant a solvent-free novolac resin reactive with hexamethylenetetramine and hexamethylenetetramine in amount sufficient to form with the novolac resin on heating a thermoset resin, said novolac resin being a crystallizable novolac resin containing a major amount of polyphenylols having the structure:

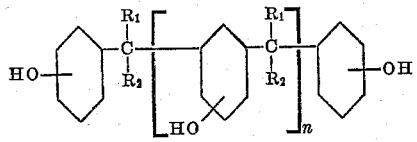

wherein $R_1$ and $R_2$ are selected from the group consisting of hydrogen and alkyl, $n$ has a value between zero and one.

9. Impregnated fibrous material according to claim 8 wherein the crystallizable novolac resin is a condensation product of phenol and formaldehyde.

References Cited in the file of this patent

UNITED STATES PATENTS

| | | |
|---|---|---|
| 1,029,737 | Aylsworth | June 18, 1912 |
| 1,047,484 | Aylsworth | Dec. 17, 1912 |
| 1,111,286 | Aylsworth | Sept. 22, 1914 |
| 1,695,912 | Brown | Dec. 18, 1928 |
| 2,376,706 | Lum | May 22, 1945 |

FOREIGN PATENTS

| | | |
|---|---|---|
| 375,012 | Great Britain | of 1932 |